United States Patent
Kageyama et al.

(10) Patent No.: US 10,017,395 B2
(45) Date of Patent: Jul. 10, 2018

(54) AMMONIA SYNTHESIS CATALYST AND AMMONIA SYNTHESIS METHOD

(71) Applicant: Japan Science and Technology Agency, Kawaguchi-shi, Saitama (JP)

(72) Inventors: Hiroshi Kageyama, Kyoto (JP); Yoji Kobayashi, Kyoto (JP); Naoya Masuda, Kyoto (JP); Hideo Hosono, Tokyo (JP)

(73) Assignee: Japan Science and Technology Agency, Saitama (JP)

( * ) Notice: Subject to any disclaimer, the term of this patent is extended or adjusted under 35 U.S.C. 154(b) by 133 days.

(21) Appl. No.: 15/125,462

(22) PCT Filed: Jan. 9, 2015

(86) PCT No.: PCT/JP2015/050545
§ 371 (c)(1),
(2) Date: Sep. 12, 2016

(87) PCT Pub. No.: WO2015/136954
PCT Pub. Date: Sep. 17, 2015

(65) Prior Publication Data
US 2017/0088433 A1 Mar. 30, 2017

(30) Foreign Application Priority Data
Mar. 13, 2014 (JP) .................... 2014-050700

(51) Int. Cl.
| | | |
|---|---|---|
| *B01J 23/00* | (2006.01) | |
| *B01J 23/02* | (2006.01) | |
| *B01J 37/02* | (2006.01) | |
| *C01C 1/04* | (2006.01) | |
| *B01J 23/58* | (2006.01) | |
| *B01J 23/78* | (2006.01) | |
| *B01J 37/16* | (2006.01) | |

(52) U.S. Cl.
CPC .......... *C01C 1/0411* (2013.01); *B01J 23/002* (2013.01); *B01J 23/58* (2013.01); *B01J 23/78* (2013.01);
(Continued)

(58) Field of Classification Search
CPC ............... C01C 1/04–1/05; B01J 23/00–37/00
See application file for complete search history.

(56) References Cited

U.S. PATENT DOCUMENTS

| 4,163,775 A | 8/1979 | Foster et al. |
| 4,250,057 A | 2/1981 | Foster et al. |

(Continued)

FOREIGN PATENT DOCUMENTS

| CN | 102658135 | 9/2012 |
| CN | 102744060 | 10/2012 |

(Continued)

OTHER PUBLICATIONS

Kitano, et al., "Ammonia synthesis using a stable electride as an electron donor and reversible hydrogen store", Nature Chemistry, vol. 4, Nov. 2012, pp. 934-940.
(Continued)

*Primary Examiner* — Colleen P Dunn
(74) *Attorney, Agent, or Firm* — Hamre, Schumann, Mueller & Larson, P.C.

(57) ABSTRACT

The ammonia synthesis catalyst of the present invention, comprises: a powder of a perovskite oxyhydride having hydride ($H^-$) incorporated therein as a support; and a metal or a metal compound exhibiting a catalytic activity for ammonia synthesis, supported on the support, and the perovskite oxyhydride is represented by $ATiO_{3-x}H_x$ (wherein A represents Ca, Sr, or Ba, and $0.1 \leq x \leq 0.6$).

12 Claims, 6 Drawing Sheets

(52) U.S. Cl.
CPC ........... *B01J 37/0236* (2013.01); *B01J 37/16* (2013.01); *B01J 2523/00* (2013.01)

(56) References Cited

U.S. PATENT DOCUMENTS

| | | | |
|---|---|---|---|
| 2013/0183224 A1 | 7/2013 | Hosono et al. | |
| 2013/0183225 A1* | 7/2013 | Von Dollen | C30B 30/02 423/409 |
| 2014/0128252 A1* | 5/2014 | Hosono | C01G 23/003 502/350 |

FOREIGN PATENT DOCUMENTS

| | | |
|---|---|---|
| CN | 103357406 | 10/2013 |
| JP | 51-47674 B | 12/1976 |
| JP | 54-37592 B | 11/1979 |
| JP | 59-16816 B | 4/1984 |
| JP | 6-015041 B | 3/1994 |
| JP | 8-141399 | 6/1996 |
| WO | 2012/077658 | 6/2012 |
| WO | 2013/008705 | 1/2013 |

OTHER PUBLICATIONS

Yang, et al., "Low temperature ruthenium catalyst for ammonia synthesis supported on BaCeO3 nanocrystals", catalysis communications, vol. 11, 2010, pp. 867-870.
Wang, et al., "Highly effective perovskite-type BaZrO3 supported Ru catalyst for ammonia synthesis", Applied Catalysis A: General 458, 2013, pp. 130-136.
Wang, et al., "Ammonia synthesis over ruthenium catalyst supported on perovskite type BaTiO3", Catalysis Communications, vol. 32, 2013, pp. 11-14.
Horiuchi, et al., "Development of Ruthenium-loaded Alkaline-earth Titanates as Catalysts for Ammonia Synthesis" Chemical Letters, vol. 42, 2013, pp. 1282-1284.
Kobayashi, et al., "An oxyhydribe of BaTiO3 exhibiting hydride exchange and electronic conductivity", Nature Materials, vol. 11, Jun. 2012, pp. 507-511.
Sakaguchi, et al., "Oxyhydrides of (Ca,Sr, Ba)TiO3 Perovskite Solid Solutions", Inorganic Chemistry, vol. 51, 2012, pp. 11371-11376.
Yajima, et al., Oxyhydrides with Perovskite Structure, Journal of the Crystallographic Society of Japan, vol. 55, No. 4, Aug. 2013, pp. 242-247—with an English abstract.
Waser, "Solubility and diffusivity of hydrogen defects in BaTiO3 ceramics", Science of Ceramics, vol. 14, 1988, pp. 383-388.
Shima, et al., "Dinitrogen Cleavage and Hydrogenation by the Trinuclear Titanium Polyhydride Complex", Science, vol. 340, No. 6140, Jun. 2013, pp. 1549-1552.
Steinsvik, et al., "Hydrogen ion conduction in iron-substituted strontium titanate, $SrTi_{1-x}Fe_xO_{3-x/2}(0 \leq x \leq 0.8)$", Solid State Ionics, vol. 143, 2001, pp. 103-116.
International Search Report issued for International Application No. PCT/JP2015/050545, Apr. 14, 2015, 9 pages with translation.
The 52nd Symposium on Basic Science of Ceramics, Abstract Book, Nagoya 2014, published on Jan. 9, 2014—English abstract.

* cited by examiner

[Fig. 1]
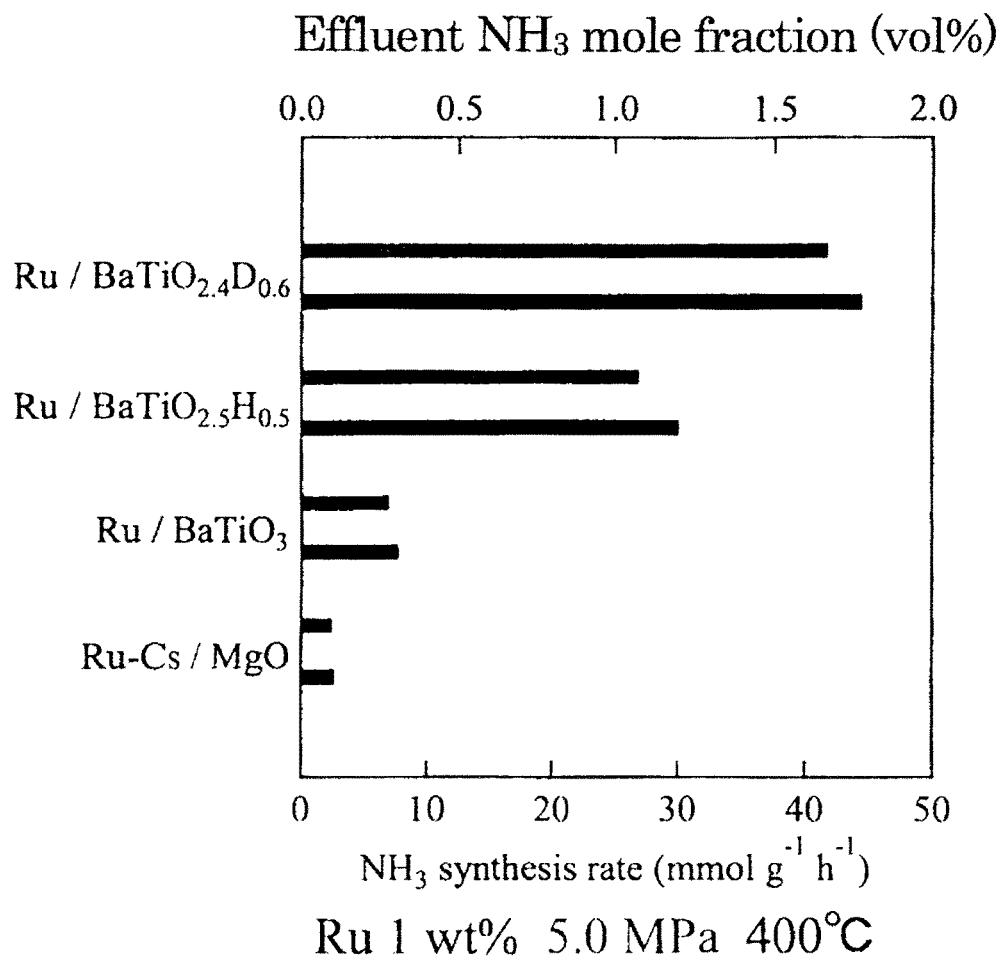
[Fig. 2]
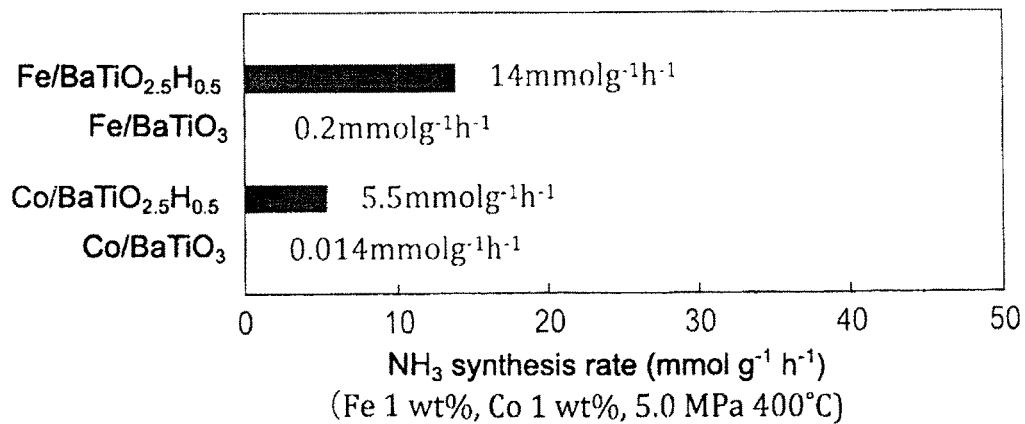

[Fig. 3]
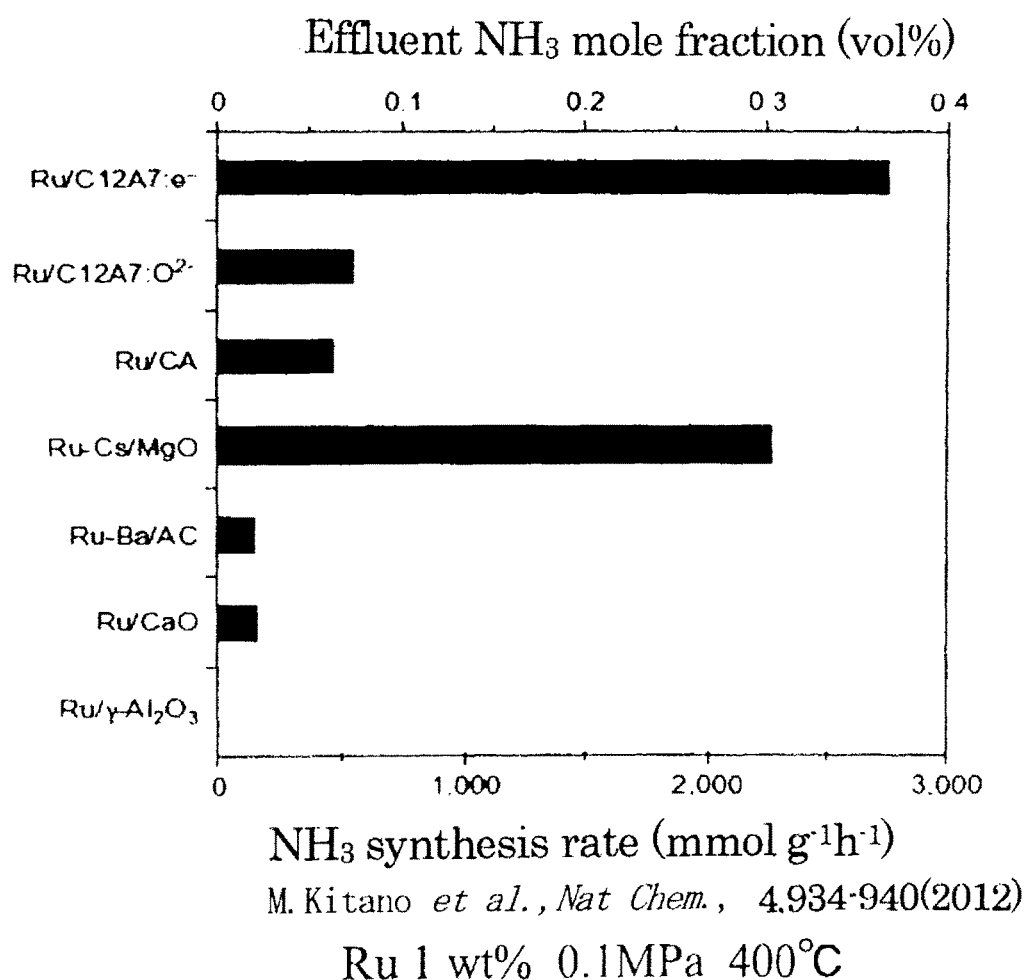

[Fig. 4]
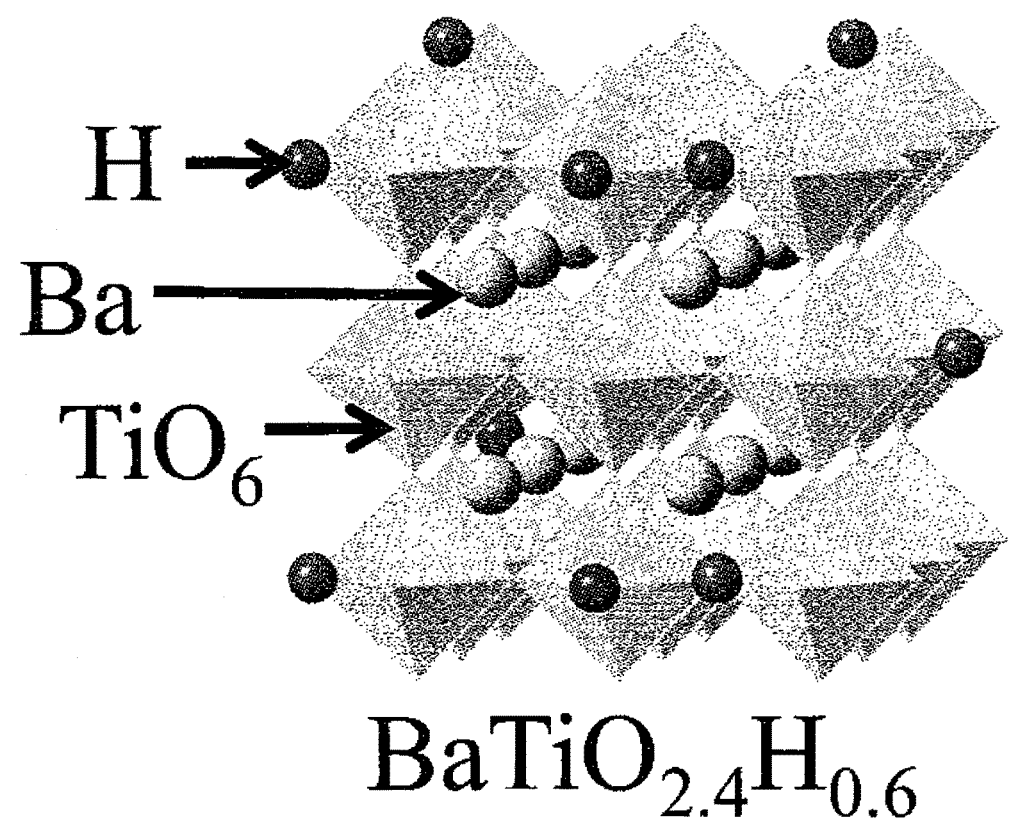

1 wt% Ru/BaTiO$_{2.5}$H$_{0.5}$ 1 wt% Ru/BaTiO$_3$

[Fig. 6]
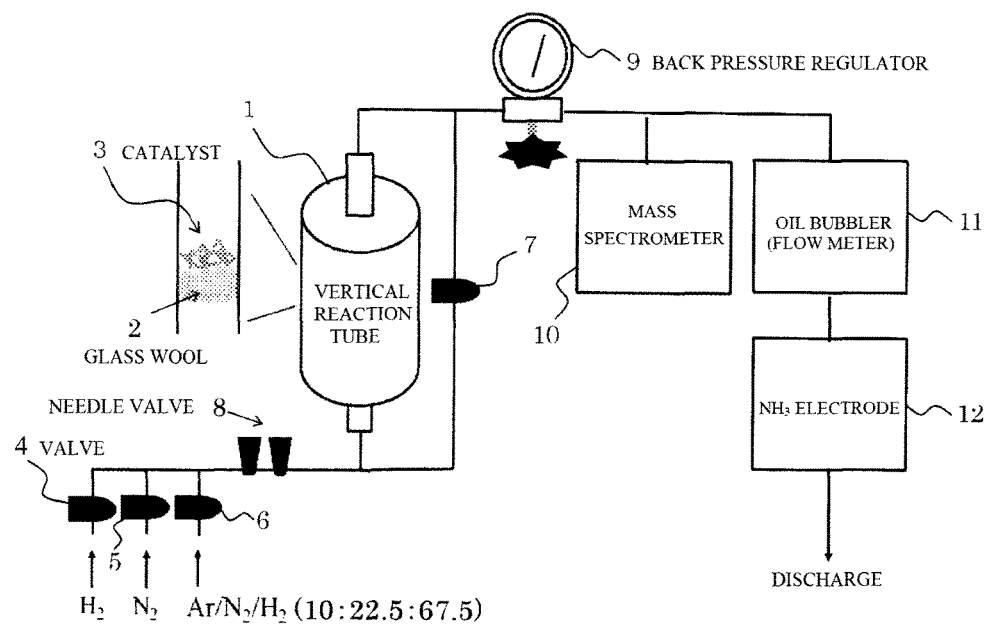

[Fig. 7]
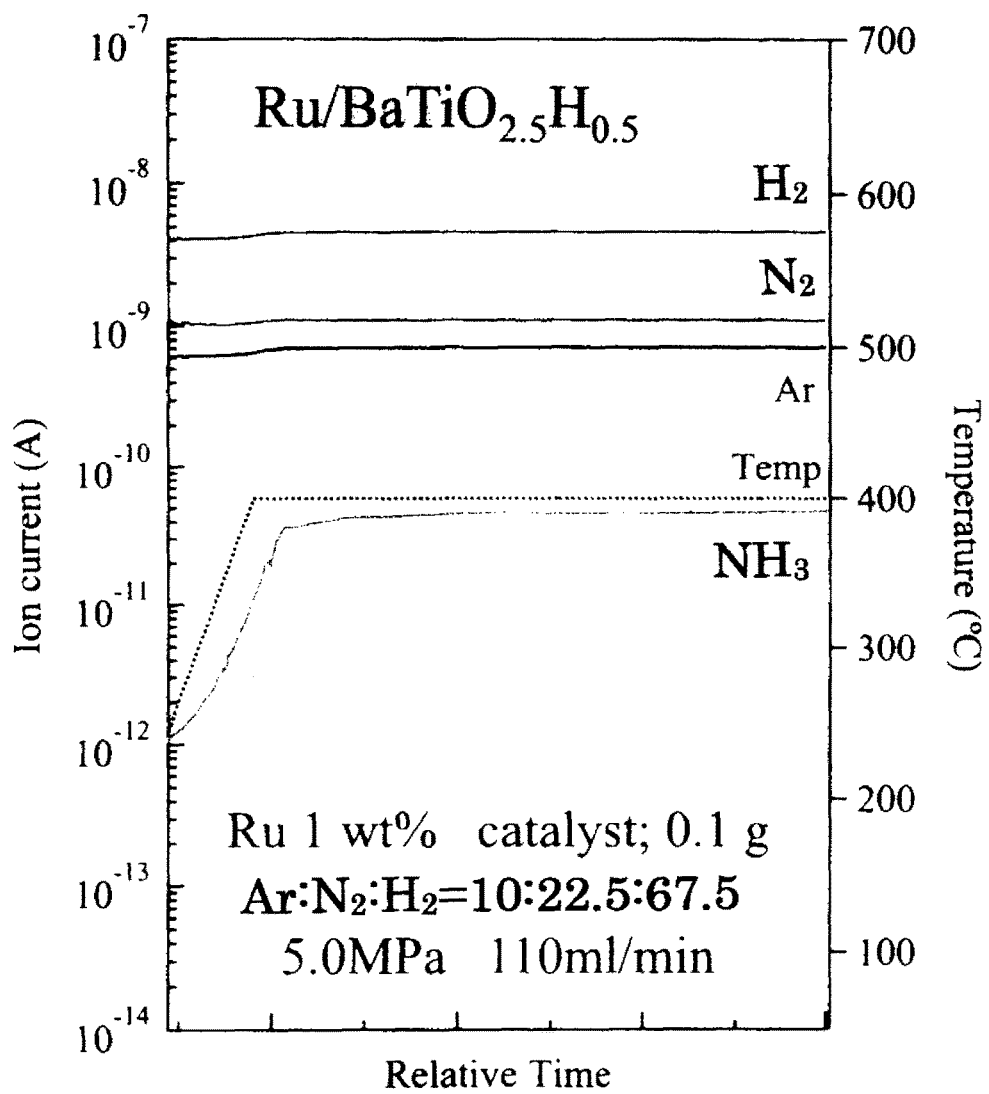

AMMONIA SYNTHESIS CATALYST AND AMMONIA SYNTHESIS METHOD

TECHNICAL FIELD

The present invention relates to an ammonia synthesis catalyst to be used for synthesizing ammonia by reacting hydrogen and nitrogen using a gas containing hydrogen and nitrogen as raw materials, and an ammonia synthesis method using the catalyst.

BACKGROUND ART

Ammonia synthesis is one of the fundamental processes in the chemical industries, and the Haber-Bosch method using iron oxide as a catalyst and potassium hydroxide as a promoter is widely used. This method has not largely changed in about 100 years. In ammonia synthesis by the Haber-Bosch method, the synthesis is performed by reacting nitrogen gas and hydrogen gas on a catalyst under high-temperature and high-pressure conditions at 300° C. to 500° C. and 20 to 40 MPa. The reaction for synthesizing ammonia using a gas containing hydrogen and nitrogen as raw materials is represented by $N_2 + 3H_2 \Leftrightarrow 2NH_3$, however, this reaction is an exothermic reaction, and therefore, in order to shift the equilibrium to the right, a lower temperature is better. However, the number of molecules is decreased by the reaction, and therefore, in order to shift the equilibrium to the right, a higher pressure is better.

However, a nitrogen molecule has a very strong triple bond between nitrogen atoms, and therefore has extremely poor reactivity and the reaction between nitrogen and hydrogen is extremely slow. Therefore, it was extremely important to develop a catalyst capable of activating a nitrogen molecule by breaking the triple bond of the nitrogen molecule. Haber et al. used an iron ore as a catalyst. This iron ore contains iron oxide as a main component and also contains alumina and potassium oxide. In the Haber-Bosch method, iron oxide is packed in a reactor as a catalyst, however, what actually reacts is metallic iron generated by reduction with hydrogen. Alumina works as a support without being reduced and prevents iron particles from sintering, and potassium oxide donates electrons to iron particles as a base to enhance the catalytic ability. Due to these actions, it is called "doubly promoted iron catalyst". However, even if this iron catalyst is used, the reaction rate is not sufficient at a low temperature of 400° C. or lower.

In a conventional industrial technique, hydrogen is produced by reforming natural gas or the like and is reacted with nitrogen in the air under the conditions above in the same plant, whereby ammonia is synthesized. As the catalyst for ammonia synthesis, conventionally, $Fe/Fe_3O_4$ is mainly used, however, recently, an Fe/C or Ru/C catalyst in which active carbon is used as a support is also used.

It is known that when Ru is formed on a support as metal catalyst particles for ammonia synthesis and used, the reaction proceeds at a low pressure, and it has attracted attention as a second generation ammonia synthesis catalyst. However, Ru as a single substance has very small catalytic ability, and in order to make it exhibit an ability to break the triple bond of a nitrogen molecule to convert the molecule to adsorbed nitrogen atoms on the Ru metal catalyst particle, it is preferred to simultaneously use a material having high electron-donating properties, and therefore, it is necessary to use a support composed of a basic material in place of $Fe_3O_4$ or active carbon, or to use a promoter compound such as an alkali metal, an alkali metal compound, or an alkaline earth metal compound.

As a catalyst for ammonia synthesis, there are a catalyst, which contains, as a transition metal having an ammonia synthesis activity at a low temperature of 300° C. or lower, one element selected from Mo, W, Re, Fe, Co, Ru, and Os, or at least one combination of Fe and Ru, Ru and Re, and Fe and Mo; K or Na; and alumina, thoria, zirconia, or silica, in which the transition metal and the alkali metal are substantially in a metal state (PTL 1), a catalyst capable of synthesizing ammonia even at a low temperature such as 200° C., in which any of transition metals of Groups 8 and 9 such as Fe, Ru, Os and Co, and an alkali metal are supported on active carbon or porous carbon (PTL 2), a catalyst, in which an alkali metal salt is used in place of an alkali metal, and graphite-containing carbon having a specific surface area is used as a catalyst support (PTL 3), a catalyst for producing ammonia, in which metallic ruthenium or a chlorine-free ruthenium compound and a rare earth element compound, are supported on a hardly reducible oxide such as alumina or magnesia (PTL 4), an ammonia synthesis catalyst, which is composed of Ru, Ni, and Ce, in which at least part of the cerium atoms are in a trivalent state (PTL 5), and the like.

An electride-based catalyst composed of Ru/CaO—$Al_2O_3$ incorporates an electron in a crystal structure of a CaO—$Al_2O_3$ compound, and can also incorporate a hydrogen atom from surrounding glass during a reaction. It has been reported that from these two characteristics, it has a high catalytic activity for ammonia synthesis (NPL 1), and a patent application was made for an invention relating to an ammonia synthesis method in which nitrogen and hydrogen as raw materials are reacted on a catalyst under conditions of a reaction temperature from 100° C. to 600° C. or lower and a reaction pressure of 10 kPa to 30 MPa (PTL 6).

It has been attempted to apply perovskite composite oxides to various applications such as exhaust gas purification catalysts, superconductive oxides, piezoelectric bodies, sensors, and fuel cell electrolytes. It has been reported that a Ru catalyst supported on a $BaCeO_3$ nanocrystal among the perovskite composite oxides has an excellent catalytic activity at a low temperature of 623 K or lower as an ammonia synthesis catalyst as compared with Ru/$\gamma$-$Al_2O_3$, Ru/MgO, and Ru/$CeO_2$ catalysts (NPL 2). In addition, an ammonia synthesis catalyst composed of Ru/$BaZrO_3$ (NPL 3, PTL 7, and PTL 8) and an ammonia synthesis catalyst composed of a titanium-containing perovskite oxide such as Ru/$BaTiO_3$, Ru/$SrTiO_3$, or Ru/$CaTiO_3$ have also been reported (NPL 4 and NPL 5), and a patent application has been made (PTL 9).

Titanium-containing oxides having a perovskite crystal structure or a layered perovskite crystal structure represented by $MTiO_3$ (wherein M represents Ca, Ba, Mg, Sr, or Pb), titanium-containing oxides in which some of the Ti atoms are substituted with at least one of Hf and Zr (collectively referred to as "titanium-containing perovskite oxides") have an extremely high relative dielectric constant, and therefore have been actively studied for a long time as devices such as capacitor materials and dielectric films and also in terms of applications to substrate materials of other perovskite transition metal oxides and nonlinear resistors.

The present inventors have reported the synthesis of titanium oxyhydrides (titanate oxyhydrides) based on the formula: $ATi(O,H)_3$ (wherein A represents $Ca^{2+}$, $Sr^{2+}$, or $Ba^{2+}$) (NPL 6 to NPL 8, and PTL 10). This oxyhydride is a compound in which hydrogen is made to coexist as hydride ($H^-$) with an oxide ion ($O^{2-}$), and is prepared by a method for reducing a precursor $ATiO_3$ into a topochemical with a metal hydride such as $CaH_2$, $LiH$, or $NaH$. This oxyhydride is characterized by having hydride ion-electron mixed conductivity, and hydrogen storage and release properties.

CITATION LIST

Patent Literature

PTL 1: JP-B-51-47674
PTL 2: JP-B-54-37592
PTL 3: JP-B-59-16816
PTL 4: JP-B-06-15041
PTL 5: JP-A-08-141399
PTL 6: WO 2012/077658 A1
PTL 7: Chinese Patent Application No. CN 102658135 (A)
PTL 8: Chinese Patent Application No. CN 103357406 (A)
PTL 9: Chinese Patent Application No. CN 102744060 (A)
PTL 10: WO 2013/008705 A1

Non Patent Literature

NPL 1: Kitano et al., Nat. Chem., 4, 934-940 (2012)
NPL 2: X-L Yang et al., Cat. Commun., 11, 867-870 (2010)
NPL 3: W. Ziqing et al., Applied Catalysis A: 458, 130-136 (2013)
NPL 4: W. Ziqing et al., Cat. Commun., 32, 11-14 (2013)
NPL 5: Y. Horiuchi et al., Chemistry Letters, Vol. 42, No. 10, pp 1282-1284 (2013)
NPL 6: Y. Kobayashi et al., Nat. Mater., 11, 507 (2012)
NPL 7: T. Sakaguchi et al., Inorg. Chem., 116, 3855 (2012)
NPL 8: Ken Yajima et al., Journal of the Crystallographic Society of Japan, Vol., 55, No. 4, pp 242-247 (2013)

SUMMARY OF INVENTION

Technical Problem

A reaction for synthesizing ammonia using a gas containing hydrogen and nitrogen as raw materials is represented by $N_2 + 3H_2 \Leftrightarrow 2NH_3$, however, there are three points to be a bottleneck for shifting the equilibrium to the right. A first point is that it is difficult to break the triple bond between nitrogen atoms of a $N_2$ molecule; a second point is that a catalytic activity is decreased due to hydrogen poisoning which is a phenomenon in which the surfaces of catalyst metal particles are covered with hydrogen atoms dissociatively adsorbed under high pressure; and a third point is that in the case where alumina or active carbon which does not exhibit electron-donating properties is used as a support, a large amount of a promoter is needed.

Heretofore, in order to overcome problems as described above so as to be able to synthesize ammonia even at a lower pressure and a lower temperature, combinations of various supports and catalyst metals have been attempted, however, almost all combinations of known catalyst metals and supports were examined. The current situation is that it is extremely difficult to search for a novel catalyst having an activity greatly surpassing the activity which can be achieved by the combination of known catalyst metals and supports.

Solution to Problem

The present inventor found that when a catalyst is formed by using the titanium-containing perovskite oxyhydride, having hydride ($H^-$) incorporated therein, the synthesis of which was achieved by the present inventors before, as a support, and supporting a metal exhibiting a catalytic activity such as Ru or Fe thereon, by the specific action of hydride ($H^-$), the ammonia synthesis activity is dramatically improved, and is stable also in the reaction for a long time without using an alkali metal, an alkaline earth metal, and a compound thereof, which are unstable, as promoter compounds, and thus, the catalyst becomes an ammonia synthesis catalyst having a significantly higher activity than the conventionally known catalyst having the highest activity, and highly efficient ammonia synthesis at a low pressure of less than 20 MPa can be realized.

Further, it was found that when the Ti-containing perovskite oxyhydride is heated to a low temperature of 400 to 600° C. in an ammonia gas or $N_2/H_2$ mixed gas stream, nitride ions are introduced through a process of H/N exchange between hydride (hereinafter, sometimes also referred to as "H") and nitrogen (hereinafter, sometimes also referred to as "N"), whereby $BaTi(O,H,N)_3$ is formed.

The present invention is based on the above finding and is directed to an ammonia synthesis catalyst comprising: a powder of a perovskite oxyhydride having hydride ($H^-$) incorporated therein as a support; and a metal or a metal compound exhibiting a catalytic activity for ammonia synthesis, supported on the support.

The perovskite oxyhydride is represented by $ATiO_{3-x}H_x$ (wherein A represents Ca, Sr, or Ba, and $0.1 \leq x \leq 0.6$).

The perovskite oxyhydride may further contain nitrogen. The composition in the case of containing nitrogen can be represented by the formula: $ATi(O_{3-z}H_xN_y)$ (wherein A represents Ca, Sr, or Ba, and $0.1 \leq x \leq 0.6$, $0 < y \leq 0.3$, $z \geq x+y$, and z-x-y represents the amount of oxygen defects).

The metal exhibiting a catalytic activity is supported on the surface of the powder in the form of metal nanoparticles. Further, the metal compound exhibiting a catalytic activity is mixed with the powder and supported thereon.

The preferable metal exhibiting a catalytic activity or the metal of the metal compound exhibiting a catalytic activity is Ru and the supported amount in terms of Ru metal with respect to the support is from preferably 0.1 to 5 wt %.

A method for producing a catalyst of the present invention, comprises: a first step of preparing a powder of a perovskite oxyhydride having hydride ($H^-$) incorporated therein by keeping a powder of a perovskite titanium-containing oxide as a starting material together with a powder of an alkali metal hydride or an alkaline earth metal hydride selected from $LiH$, $CaH_2$, $SrH_2$, and $BaH_2$ in a temperature range of 300° C. or higher and lower than the melting point of the hydride in a vacuum or in an inert gas atmosphere, thereby substituting some of the oxide ions in the oxide with hydride ions; a second step of preparing a catalyst precursor by dispersing the perovskite oxyhydride powder obtained in the first step in a solvent solution of a compound of a metal having an ammonia synthesis activity, followed by evaporating the solvent; and a third step of preparing a catalyst having a metal compound exhibiting a catalytic activity supported on the powder by drying the catalyst precursor obtained in the second step.

The method for producing a catalyst of the present invention may include up to the third step, however, it is preferred that the method further includes, after the third step, a fourth step of preparing a catalyst having metal nanoparticles supported on the surface of the powder by heating and reducing the metal compound in a reducing atmosphere or thermally decomposing the metal compound in a vacuum.

The above production method may have, after the first step and before the second step, a step of incorporating nitrogen in the perovskite oxyhydride by treating the powder of the perovskite oxyhydride in the presence of a nitrogen supply source substance.

The above production method may have, after the third step or the fourth step, a step of incorporating nitrogen in the perovskite oxyhydride by treating the catalyst in the presence of a nitrogen supply source substance.

The ammonia synthesis method of the present invention is a method for synthesizing ammonia by reacting hydrogen and nitrogen using a gas containing hydrogen and nitrogen as raw materials, wherein the above-mentioned catalyst is packed in a catalytic packed bed in a synthesis reactor, and nitrogen and hydrogen as the raw materials are reacted on the catalyst under conditions of a reaction temperature of 300° C. to 450° C. and a reaction pressure of 10 kPa or more and less than 20 MPa.

Advantageous Effects of Invention

The catalyst of the present invention has a catalytic activity capable of achieving an $NH_3$ synthesis rate several times higher than the $NH_3$ synthesis rate (under the test conditions of 1 wt % Ru, 5.0 MPa, and 400° C.) of Ru—Cs/MgO or Ru/BaTiO$_3$ that has been reported as a catalyst having a high activity to be substituted for conventional catalysts such as Fe/Fe$_3$O$_4$, Fe/C, and Ru/C for synthesizing ammonia by reacting hydrogen and nitrogen using a gas containing hydrogen and nitrogen as raw materials, and therefore enables the reaction at a low pressure with a small catalyst amount and even at a low temperature, and thus, also facilitates the control of the reaction. In addition, it is not necessary to add a promoter compound such as an alkali metal, an alkali metal compound, or an alkaline earth metal compound unlike a conventional support of alumina or the like, and thus, the production is simple.

BRIEF DESCRIPTION OF DRAWINGS

FIG. 1 shows comparison of the catalytic activities of a Ru/BaTiO$_{2.5}$H$_{0.5}$ catalyst of Example 1, a Ru/BaTiO$_{2.4}$D$_{0.6}$ catalyst of Example 2, and catalysts of conventional examples. The upper horizontal bar of each catalyst shows an $NH_3$ synthesis concentration (vol %), and the lower horizontal bar of each catalyst shows an $NH_3$ synthesis rate (mmolg$^{-1}$h$^{-1}$).

FIG. 2 shows comparison of the catalytic activities of a Co/BaTiO$_{2.5}$H$_{0.5}$ catalyst of Example 3, a Fe/BaTiO$_{2.5}$H$_{0.5}$ catalyst of Example 4, and catalysts of conventional examples.

FIG. 3 shows comparison (literature data) of the catalytic activities of an electride-based catalyst composed of Ru/CaO—Al$_2$O$_3$ and previously reported representative catalysts.

FIG. 4 is a schematic view of the crystal structure of a Ti-containing perovskite oxyhydride.

FIG. 6 is a schematic diagram of a device used for evaluation of ammonia synthesis in Example 1.

FIG. 7 is a graph showing the results of evaluation of ammonia production in Example 1.

DESCRIPTION OF EMBODIMENTS

Figure 5A:
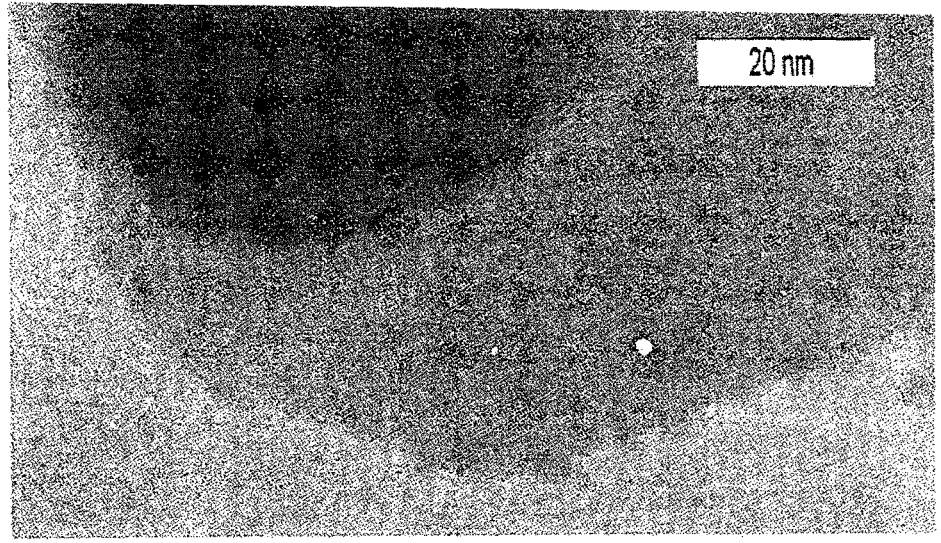
FIG. 5A and FIG. 5B show photographs substituted for drawings showing TEM images of Ru-supported catalysts obtained in Example 1 and Comparative Example 1.

The ammonia synthesis catalyst of the present invention is constituted by a support composed of a powder of a perovskite oxyhydride having hydride (H$^-$) incorporated therein and a metal or a metal compound exhibiting a catalytic activity for ammonia synthesis supported on the support.

<Composition and Structure of Titanium-Containing Perovskite Oxyhydride>

A titanium-containing perovskite oxyhydride in which some of the oxide ions contained in a titanium-containing perovskite oxide are substituted with hydride ions (H$^-$). A Ti-containing perovskite oxide can incorporate hydride ions (H$^-$) in a low concentration to a high concentration under specific heat treatment conditions, and can be represented by the formula: $ATiO_{3-x}H_x$ (wherein A represents Ca, Sr, or Ba, and $0.1 \leq x \leq 0.6$). When the value of x is less than 0.1, the effect of improving the catalytic activity by hydride ions is not sufficient, and when it exceeds 0.6, the crystallinity deteriorates and impurities emerge, and therefore, such values are not desirable. As the content of hydrogen represented by x increases within this range, the catalytic activity for ammonia synthesis increases. A more preferred range of the value of x is from 0.3 to 0.6.

The Ti-containing perovskite oxyhydride maintains a perovskite structure composed of octahedra which share vertices as shown in FIG. 4. A Ti atom is present at the center of the octahedron, and an oxide anion and a hydride anion are present at the vertices of the octahedron. Examples of the oxyhydride of the Ti-containing perovskite oxide include ATi(O,H)$_3$ (wherein A represents Ca, Sr, or Ba), SrTi(O,H)$_3$, and Sr$_3$Ti$_2$(O,H)$_7$ and Sr$_2$Ti(O,H)$_4$ which are layered perovskites.

The catalyst of the present invention can be produced by the following steps.

<First Step: Preparation of Ti-Containing Perovskite Oxyhydride>

The titanium-containing perovskite oxyhydride can be prepared as a powder of a perovskite oxyhydride by keeping a powder of a perovskite titanium-containing oxide as a starting material together with a powder of an alkali metal hydride or an alkaline earth metal hydride selected from lithium hydride (LiH), calcium hydride (CaH$_2$), strontium hydride (SrH$_2$), and barium hydride (BaH$_2$) in a temperature range of 300° C. or higher and lower than the melting point of the hydride, desirably 300° C. or higher and 600° C. or lower in a vacuum or in an inert gas atmosphere, followed by cooling to room temperature thereby substituting some of the oxide ions in the oxide with hydride ions. The temperature-increasing rate to the temperature at which the powders are kept and the temperature-decreasing rate to room temperature are not limited. The time required for keeping the powders may be about one hour or more and up to about 1 week though depending on the temperature.

The Ti-containing perovskite oxide as the starting material can be represented by the general formula: ATiO$_3$ (wherein A represents Ca, Sr, or Ba). The Ti-containing perovskite oxide as the starting material, particularly the production method or form thereof is not limited. A perovskite oxide is produced by various methods such as a solid state reaction, an oxalic acid method, a citric acid method, a hydrothermal method, and a sol-gel method, however, as the catalyst, a catalyst having a larger specific surface area is desirable, and a catalyst having a specific surface area of 30 m$^2$/g or more and a particle size distribution of about 5 to 500 nm is desirable.

The obtained Ti-containing perovskite oxide containing hydride ions has both hydride ion conductivity and electronic conductivity, and also has reactivity with outside hydrogen gas at a low temperature of about 450° C. or lower, and therefore, when the contained hydrogen is reacted and substituted with deuterium, $ATiO_{3-x}D_x$ (wherein A=Ca, Sr, or Ba, $0.1 \leq x \leq 0.6$, and D represents deuterium) can be formed, which can also be used as a support. When hydrogen is substituted with deuterium, the composition has a high hydride concentration.

Further, the method may include, after the first step, a step of incorporating nitrogen in the perovskite oxyhydride by treating the obtained Ti-containing perovskite oxyhydride in the presence of a nitrogen supply source substance such as ammonia gas, nitrogen gas, or a nitrogen compound. For example, when the Ti-containing perovskite oxyhydride is heated to a low temperature of 400 to 600° C. in an ammonia gas or $N_2/H_2$ mixed gas stream, $BaTi(O,N,H)_3$, which is a nitride, is formed through a H/N exchange process. In this manner, when a material obtained by introducing nitride ions into the Ti-containing perovskite oxyhydride in advance is used as a support, stabilization of $ATiO_{3-x}H_x$ during an ammonia synthesis reaction is brought about. The Ti-containing perovskite oxyhydride having nitride ions introduced therein is represented by the formula: $ATi(O_{3-z}H_xN_y)$ (wherein $0.1 \leq x \leq 0.6$, $0 < y \leq 0.3$, $z \geq x+y$, and z−x−y represents the amount of oxygen defects).

It is presumed that also in the case where the Ti-containing perovskite oxyhydride is used as a catalyst under ammonia synthesis conditions, $BaTi(O,N,H)_3$ is formed in the same manner so as to contribute to the stabilization of the catalyst.

<Second Step: Preparation of Catalyst Precursor>

The supporting of a metal on a perovskite oxyhydride support is performed by an impregnation method. As the metal compound to be used as the starting material, a compound such as a chloride is used. In particular, it is preferred to use a carbonyl compound or complex which can maintain the specific properties of the perovskite oxyhydride and is easily decomposed. For example, in the case where Ru is used as the metal exhibiting a catalytic activity, examples of a ruthenium compound include ruthenium chloride, ruthenium carbonyl, ruthenium acetylacetonate, ruthenium potassium cyanate, potassium ruthenate, ruthenium oxide, and ruthenium nitrate. Any of these metal compounds is dissolved in a polar organic solvent such as acetone or tetrahydrofuran or water, whereby a solvent solution is formed. The perovskite oxyhydride powder is dispersed in this solvent solution, followed by evaporating the solvent, whereby a catalyst precursor is prepared.

<Third Step: Supporting of Metal Compound>

Further, the catalyst precursor obtained in the second step is dried, whereby a catalyst having a metal compound exhibiting a catalytic activity supported on the powder is prepared. Before the catalyst is used in an ammonia synthesis reaction, a hydrogen reduction treatment is generally performed, and therefore, a step of reducing the metal compound in the subsequent step may be omitted.

<Fourth Step: Supporting of Metal Particles>

After the third step, further, the metal compound is heated and reduced in a reducing atmosphere or thermally decomposed in a vacuum, whereby metal nanoparticles are supported on the surface of the powder. In the case where metal nanoparticles are formed on the surface of the powder by hydrogen reduction of the metal compound, the hydrogen reduction temperature is from 100° C. to 700° C., preferably from 300° C. to 600° C., and the hydrogen reduction time is generally preferably from 1 to 5 hours.

The supported amount of the metal exhibiting a catalytic activity or the metal of the metal compound exhibiting a catalytic activity in terms of the metal with respect to the support is from 0.1 to 20 wt %. When the supported amount is less than 0.1 wt %, the catalytic activity is low, and when the supported amount exceeds 20 wt %, even if the supported amount is increased, improvement of the ammonia synthesis activity is not observed. The most preferred metal as the metal exhibiting a catalytic activity is ruthenium, however, since ruthenium is an expensive metal, in the case of ruthenium, the supported amount is preferably from 0.1 to 5 wt %.

The method may include, after the third step or the fourth step, a step of incorporating nitrogen in the perovskite oxyhydride by treating the catalyst in the presence of a nitrogen supply source substance. Also in this case, in the same manner as in the case of introducing nitride ions into the perovskite oxyhydride in advance after the first step and before the second step, the Ti-containing perovskite oxyhydride may be heated to a low temperature of 400 to 600° C. in an ammonia gas or $N_2/H_2$ mixed gas stream.

Incidentally, it is also possible to perform the hydride formation after supporting metal particles exhibiting a catalytic activity on the perovskite oxide in advance, however, in such a case, the metal particles are likely to be sintered to decrease the catalytic activity, and therefore, it is necessary to suppress sintering as much as possible.

<Synthesis of Ammonia>

The ammonia synthesis method of the present invention is a method in which in order to react hydrogen and nitrogen using a gas containing hydrogen and nitrogen as raw materials, the catalyst powder is packed in a catalytic packed bed in a synthesis reactor, and the raw material gas is reacted on the catalyst powder bed, whereby ammonia is synthesized. A representative form of the reaction is a method in which a mixed gas of nitrogen and hydrogen is directly reacted under heated and pressurized conditions, and ammonia produced by the reaction of $N_2 + 3H_2 \rightarrow 2NH_3$ is cooled or absorbed in water in the same manner as the conventional Haber-Bosch method. Nitrogen gas and hydrogen gas are supplied so as to come in contact with the catalyst powder bed placed in the reactor. It is preferred that before supplying nitrogen gas and hydrogen gas, the surface of the catalyst is subjected to a reduction treatment with hydrogen gas or a mixed gas of hydrogen and nitrogen so that the oxide and the like attached to the surface of the supported catalyst are removed.

It is preferred that the ammonia synthesis reaction is performed in an atmosphere which is as water-free as possible, that is, in a dry nitrogen and hydrogen atmosphere which is an atmosphere at a water vapor partial pressure of about 0.1 kPa or less.

Subsequently, by heating the catalyst in a mixed gas atmosphere of nitrogen and hydrogen as the raw materials, ammonia is synthesized. It is preferred to perform the synthesis under conditions that the molar ratio of nitrogen to hydrogen is about 1/10 to 1/1. The reaction temperature is set to room temperature or higher and lower than 500° C. The reaction temperature is more preferably from about 300 to 350° C. A lower reaction temperature is favorable for the equilibrium to produce ammonia, and the above-mentioned range is preferred for obtaining a sufficient ammonia production rate and also making the equilibrium favorable to produce ammonia.

The reaction pressure of the mixed gas of nitrogen and hydrogen when the synthesis reaction is performed is not particularly limited, but is preferably from 10 kPa to 20 MPa, more preferably from 10 kPa to 5 MPa. In consideration of practical use, it is preferred that reaction can be applicable in atmospheric pressure to a pressurized condition. Therefore, from a practical viewpoint, the reaction pressure is more preferably from about 100 kPa to 1.5 MPa.

For the reaction device, any of a batch-type reaction container, a closed circulation-type reaction device, and a flow-type reaction device may be used, however, from a practical viewpoint, a flow-type reaction device is most preferred.

<Function of Catalyst of the Present Invention>

The function of the catalyst of the present invention will be described below, however, this is an assumption and does not limit the scope of the present invention. The reason why the catalyst of the present invention exhibits excellent properties is considered to be the hydride ions in the support have a specific function which affects the nitrogen molecules and the hydrogen molecules of the raw materials. That is, a heterogeneous catalyst is generally constituted by supporting metal catalyst particles on a carbon or metal oxide support. In an oxidation reaction by a catalyst, a metal oxide directly participates in the reaction in some cases, however, in various hydrogenation reactions, the metal oxide itself is inactive as a support, and has played a relatively indirect role such as merely supporting metal particles.

However, it is presumed that the Ti-containing perovskite oxyhydride directly dissociates a gas molecule such as a hydrogen molecule at around 300 to 450° C. and preferentially adsorbs the dissociated molecule on the support, and also participates in a reaction of directly dissociating a nitrogen molecule by a conversion reaction between a hydride ion and a nitrogen molecule. It is considered that by doing this, poisoning due to accumulation of hydrogen on the metal particles is prevented. This is completely different from the conventional catalyst support, and is considered to be due to an unknown attribution of the perovskite oxyhydride having hydride (H$^-$) incorporated therein under the ammonia synthesis conditions.

Hereinafter, the present invention will be described in more detail based on Examples.

Example 1

1. Synthesis of Oxyhydride 0.3 g of a commercially available $BaTiO_3$ powder having a particle diameter distributed in a range from 100 nm to 200 nm was mixed with 3 equivalents of a $CaH_2$ powder in a glove box, and the resulting mixed powder was pressed into a tablet using a hand press. Thereafter, the tablet was vacuum-sealed in a glass tube having an internal volume of about 15 cm$^3$, and a hydrogenation reaction was performed by keeping the tablet therein at 500 to 600° C. for 168 hours (one week), whereby a $BaTiO_{2.5}H_{0.5}$ powder in which some of the oxide ions were substituted with hydride ions was synthesized.

2. Supporting of Ru

The synthesized $BaTiO_{2.5}H_{0.5}$ powder was mixed in a THF solution of $Ru_3(CO)_{12}$ and stirred for 3 hours. Thereafter, the solvent was evaporated at 40° C. in a reduced pressure state, whereby a catalyst precursor was prepared. Subsequently, this precursor was dried, and then vacuum-sealed again in the glass tube, followed by heating to 390° C. for 3 hours to thermally decompose a carbonyl compound, whereby a $Ru/BaTiO_{2.5}H_{0.5}$ powder having Ru metal particles supported thereon was obtained. The supported amount of ruthenium in the obtained $Ru/BaTiO_{2.5}H_{0.5}$ powder was 1.0 wt % in terms of Ru.

3. Form of Ru-Supported Catalyst

Figure 5B:
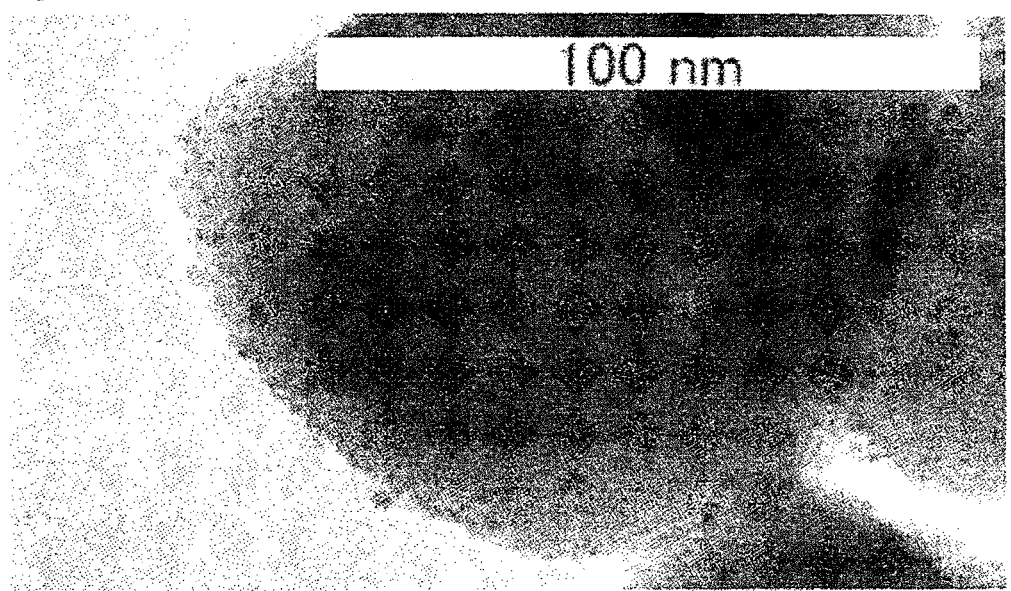

In FIG. 5, TEM images of the catalysts obtained in Example 1 (FIG. 5A) and Comparative Example 1 (FIG. 5B) are shown. From the TEM images, it is found that the particle diameter of the support of Example 1 is from about 100 to 200 nm, and the particle diameter of Ru is around 5 nm.

Example 2

1. Synthesis of Oxyhydride

A $BaTiO_{2.4}D_{0.6}$ powder having a high hydride concentration was synthesized under the same conditions as those in Example 1 except that a $CaD_2$ (D represents deuterium) powder was used in place of the $CaH_2$ powder in Example 1. The $CaD_2$ powder was prepared as follows. A chunks of Ca was reacted with $D_2$ at 600° C. for 30 minutes, and the resulting material was crushed in a nitrogen atmosphere, and the crushed material was reacted with $D_2$ again. This procedure was repeated 3 times, whereby a pure powder was prepared.

2. Supporting of Ru

Ru was supported on this powder in the same manner as in Example 1.

Example 3

1. Synthesis of Oxyhydride

A $BaTiO_{2.5}H_{0.5}$ powder was synthesized under the same conditions as those in Example 1.

2. Supporting of Co

The synthesized $BaTiO_{2.5}H_{0.5}$ powder was mixed in a THF solution of $Co(acetylacetonate)_3$ and stirred for 3 hours. Thereafter, the solvent was evaporated at 40° C. in a reduced pressure state, whereby a catalyst precursor was prepared. This catalyst precursor was packed in a catalytic packed bed of an ammonia synthesis evaluation device, and then reduced for 2 hours in a hydrogen gas stream, whereby a $Co/BaTiO_{2.5}H_{0.5}$ catalyst was formed and used.

Example 4

1. Synthesis of Oxyhydride

A $BaTiO_{2.5}H_{0.5}$ powder was synthesized under the same conditions as those in Example 1.

2. Supporting of Fe

The synthesized $BaTiO_{2.5}H_{0.5}$ powder was mixed in a THF solution of $Fe(acetylacetonate)_3$ and stirred for 3 hours. Thereafter, the solvent was evaporated at 40° C. in a reduced pressure state, whereby a catalyst precursor was prepared. This catalyst precursor was packed in a catalytic packed bed of an ammonia synthesis evaluation device, and then reduced for 2 hours in a hydrogen gas stream, whereby an Fe/BaTiO$_{2.5}$H$_{0.5}$ catalyst was formed and used.

Comparative Example 1

Ru was supported on the BaTiO$_3$ powder, which was not subjected to the hydrogenation reaction, under the same conditions as those in Example 1, whereby a Ru/BaTiO$_3$ catalyst was obtained.

Comparative Example 2

A Ru/MgO catalyst was obtained by supporting Ru under the same conditions as those in Example 1 except that a MgO powder was used in place of the BaTiO$_3$ powder in Comparative Example 1.

Comparative Example 3

Ru/MgO obtained in Comparative Example 2 was impregnated with an ethanol solution of Cs$_2$CO$_3$, followed by thermal decomposition of Cs$_2$CO$_3$, whereby a Ru—Cs/MgO (Ru/Cs=1) catalyst was obtained. The supported amount of Ru—Cs in the catalyst was 1.0 wt %.

Example 5

Ammonia Synthesis

Ammonia synthesis was performed using a fixed-bed flow-type device as shown in FIG. 6. For a synthesis reactor, a vertical reaction tube 1 was used, and 0.1 g of the Ru/BaTiO$_{2.5}$H$_{0.5}$ catalyst (Ru: 1 wt %) 3 of Example 1 was packed in a catalytic packed bed on a glass wool 2 at the center thereof. A valve 4 was opened, and valves 5, 6, and 7 were closed, and the temperature in the reaction tube 1 was set to 400° C., and then, this catalyst was reduced for 2 hours in a hydrogen gas stream.

Thereafter, the temperature was once decreased to about 150° C. or lower, and then increased again, and when the temperature reached about 200° C., the valves 4, 5, and 7 were closed, and the valve 6 was opened to change the gas flow. Then, the flow rate was adjusted with a needle valve 8, and an Ar/N$_2$/H$_2$ mixed gas (Ar:N$_2$:H$_2$=10:22.5:67.5) was made to flow in the vertical reaction tube 1 (flow rate: 110 mL/min), and in order to make the conditions closer to industrial conditions, the pressure in the vertical reaction tube 1 was increased to 5.0 MPa (50 atm) by pressurization using a back pressure regulator 9, and the temperature was gradually increased to 400° C. The produced ammonia was qualitatively confirmed using a mass spectrometer 10, and trapped in water after passing through an oil bubbler (flow meter) 11, and then, quantitatively determined using an ammonia selection electrode 12 and discharged to the air.

In FIG. 7, the results of evaluation of ammonia production using the catalyst of Example 1 are shown. In FIG. 7, the horizontal axis represents a relative time (Relative Time), the left vertical axis represents an ion current (Ion current), and the right vertical axis represents a reaction temperature (Temperature), and a change in the temperature between 200° C. and 400° C. is indicated by a dotted line. The NH$_3$ production amount increased as the increase in the temperature, and thereafter, while maintaining the temperature to be constant at 400° C., the NH$_3$ production rate did not decrease.

<Comparison of Catalytic Activity>

Also for the catalysts of Examples 2, 3, and 4, and Comparative Examples 1 to 3, evaluation was performed in the same manner as the evaluation of ammonia synthesis for the catalyst of Example 1 (H$_2$/N$_2$=3, flow rate: 110 mL/min). In FIG. 1 and FIG. 2, the activities of various catalysts in the ammonia synthesis reaction were compared based on the NH$_3$ synthesis rate (mmolg$^{-1}$h$^{-1}$). In the graph of FIG. 1, the activity of Ru/BaTiO$_{2.4}$D$_{0.6}$ of Example 2 is higher than that of the Ru/BaTiO$_{2.5}$H$_{0.5}$ catalyst of Example 1, which shows that as the hydride concentration in the support is higher, the activity is higher. The catalysts of Example 1 and Example 2 both exhibited a significantly higher catalytic activity than that of the Ru/BaTiO$_3$ catalyst of Comparative Example 1 in which Ru was supported on the BaTiO$_3$ powder which was not subjected to the hydrogenation reaction. The Ru—Cs/MgO catalyst of Comparative Example 3 has been reported as a catalyst having a high activity before, and it could be confirmed that the activities of the catalysts of the present invention are higher than this. In the graph of FIG. 2, the catalysts having Co or Fe supported thereon of Examples 3 and 4 significantly improved the activity by using an oxyhydride support although the activity thereof was not as high as that of the Ru/BaTiO$_{2.5}$H$_{0.5}$ catalyst.

In the graph of FIG. 3, the catalytic activity (literature data, M. Kitano et al., Nat. Chem., 4, 934-940, 2012) of previously reported representative catalysts such as Ru—Cs/MgO and an Ru-loaded electride catalyst Ru/C12A7:e$^-$ was compared based on the NH$_3$ synthesis rate (mmolg$^{-1}$h$^{-1}$). The literature data were obtained under a pressurization condition of 0.1 MPa at a flow rate of 60 mL/min, which were different from the evaluation conditions (pressurization condition: 5.0 MPa, and flow rate: 110 mL/min) for Examples 1, 2, 3, and 4, and Comparative Examples 1 and 3, and therefore, the catalytic activities of the catalysts of Examples 1, 2, 3, and 4 cannot be simply compared with the catalytic activities of the Ru—Cs/MgO and Ru/C12A7:e$^-$ catalysts, however, it is found that the catalytic activity of Ru—Cs/MgO of Comparative Example 3 is outstandingly high among the previously reported representative catalysts, and is the second largest after that of Ru/C12A7:e$^-$.

INDUSTRIAL APPLICABILITY

According to the catalyst of the present invention, a catalyst in which a catalytic activity has been significantly improved even if it is used at a low pressure in place of conventional high-pressure reaction conditions can be achieved by only adding a hydride formation step using a widely used Ti-containing perovskite oxide in place of a Ru catalyst using various supports, and therefore, ammonia can be highly efficiently synthesized using less energy in a method for industrially synthesizing ammonia using a gas containing hydrogen and nitrogen as raw materials.

The invention claimed is:

1. An ammonia synthesis catalyst, comprising: a powder of a perovskite oxyhydride having hydride (H$^-$) incorporated therein as a support; and a metal or a metal compound exhibiting a catalytic activity for ammonia synthesis, supported on the support.

2. The ammonia synthesis catalyst according to claim 1, wherein the perovskite oxyhydride is represented by ATiO$_{3-x}$H$_x$ (wherein A represents Ca, Sr, or Ba, and 0.1≤x≤0.6).

3. The ammonia synthesis catalyst according to claim 1, wherein the perovskite oxyhydride further contains nitrogen.

4. The ammonia synthesis catalyst according to claim 3, wherein the perovskite oxyhydride is represented by ATi ($O_{3-z}H_xN_y$) (wherein A represents Ca, Sr, or Ba, and $0.1 \leq x \leq 0.6$, $0 < y \leq 0.3$, $z \geq x+y$, and $z-x-y$ represents the amount of oxygen defects).

5. The ammonia synthesis catalyst according to claim 1, wherein the metal exhibiting a catalytic activity is supported on the surface of the powder in the form of metal nanoparticles.

6. The ammonia synthesis catalyst according to claim 1, wherein the metal compound exhibiting a catalytic activity is mixed with the powder and supported thereon.

7. The ammonia synthesis catalyst according to claim 5, wherein the metal exhibiting a catalytic activity or the metal of the metal compound exhibiting a catalytic activity is Ru and the supported amount in terms of Ru metal with respect to the support is from 0.1 to 5 wt %.

8. A method for producing an ammonia synthesis catalyst, comprising:
- a first step of preparing a powder of a perovskite oxyhydride having hydride ($H^-$) incorporated therein by keeping a powder of a perovskite titanium-containing oxide as a starting material together with a powder of an alkali metal hydride or an alkaline earth metal hydride selected from LiH, $CaH_2$, $SrH_2$, and $BaH_2$ in a temperature range of 300° C. or higher and lower than the melting point of the hydride in a vacuum or in an inert gas atmosphere, thereby substituting some of the oxide ions in the oxide with hydride ions;
- a second step of preparing a catalyst precursor by dispersing the perovskite oxyhydride powder obtained in the first step in a solvent solution of a compound of a metal having an ammonia synthesis activity, followed by evaporating the solvent; and
- a third step of preparing a catalyst having a metal compound exhibiting a catalytic activity supported on the powder by drying the catalyst precursor obtained in the second step.

9. The method for producing an ammonia synthesis catalyst according to claim 8, wherein the method further comprises, after the third step, a fourth step of preparing a catalyst having metal nanoparticles supported on the surface of the powder by heating and reducing the metal compound in a reducing atmosphere or thermally decomposing the metal compound in a vacuum.

10. The method for producing an ammonia synthesis catalyst according to claim 8, wherein the method comprises, after the first step and before the second step, a step of incorporating nitrogen in the perovskite oxyhydride by treating the powder of the perovskite oxyhydride in the presence of a nitrogen supply source substance.

11. The method for producing an ammonia synthesis catalyst according to claim 8, wherein the method comprises, after the third step or the fourth step, a step of incorporating nitrogen in the perovskite oxyhydride by treating the catalyst in the presence of a nitrogen supply source substance.

12. An ammonia synthesis method, which is a method for synthesizing ammonia by reacting hydrogen and nitrogen using a gas containing hydrogen and nitrogen as raw materials, wherein the catalyst according to claim 1 is packed in a catalytic packed bed in a synthesis reactor, and nitrogen and hydrogen as the raw materials are reacted on the catalyst under conditions of a reaction temperature of 300° C. to 450° C. and a reaction pressure of 10 kPa or more and less than 20 MPa.

* * * * *